Sept. 16, 1947.  C. A. BROWN  2,427,439
VALVE
Filed Aug. 27, 1943  2 Sheets-Sheet 1
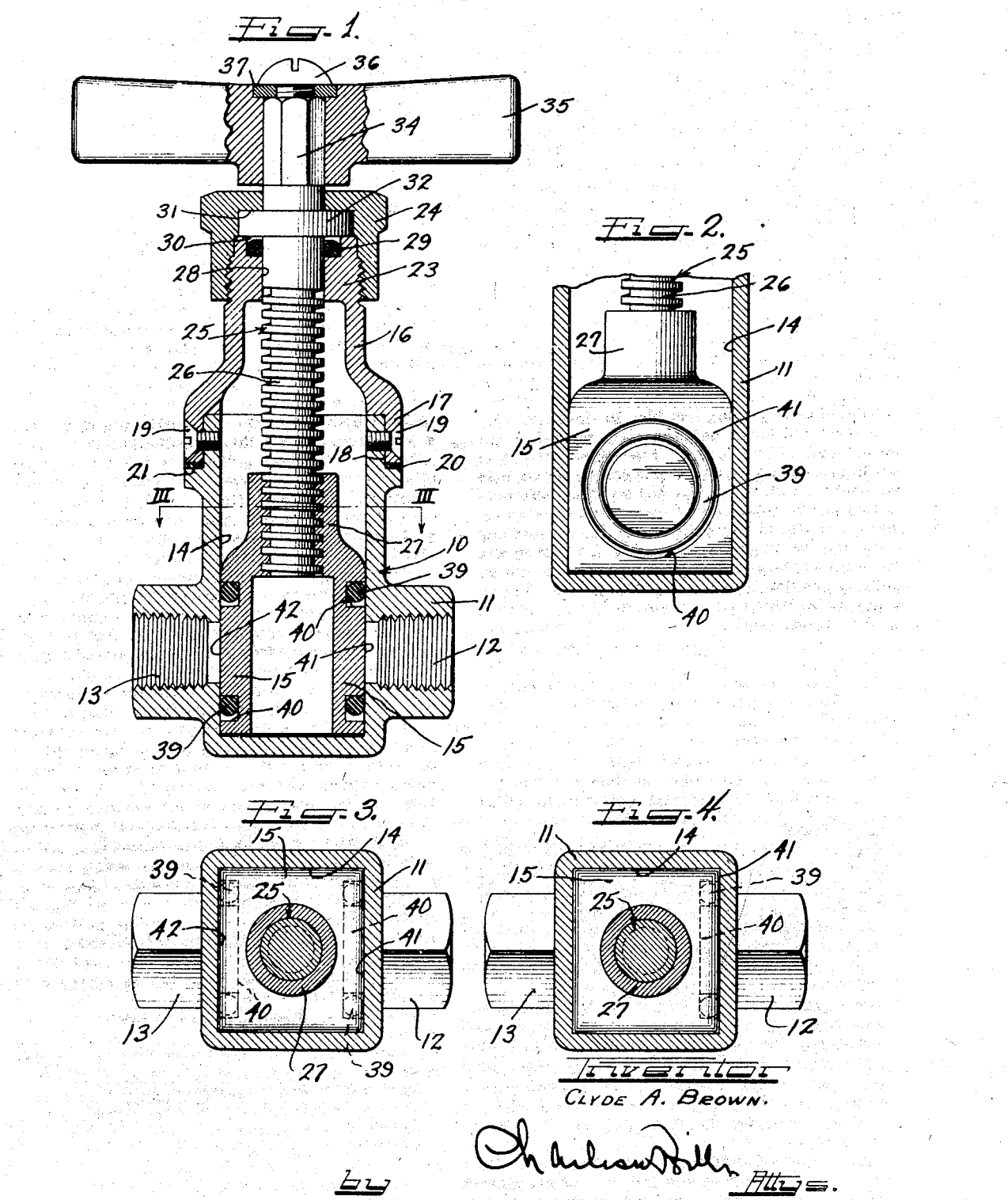
Inventor
CLYDE A. BROWN.

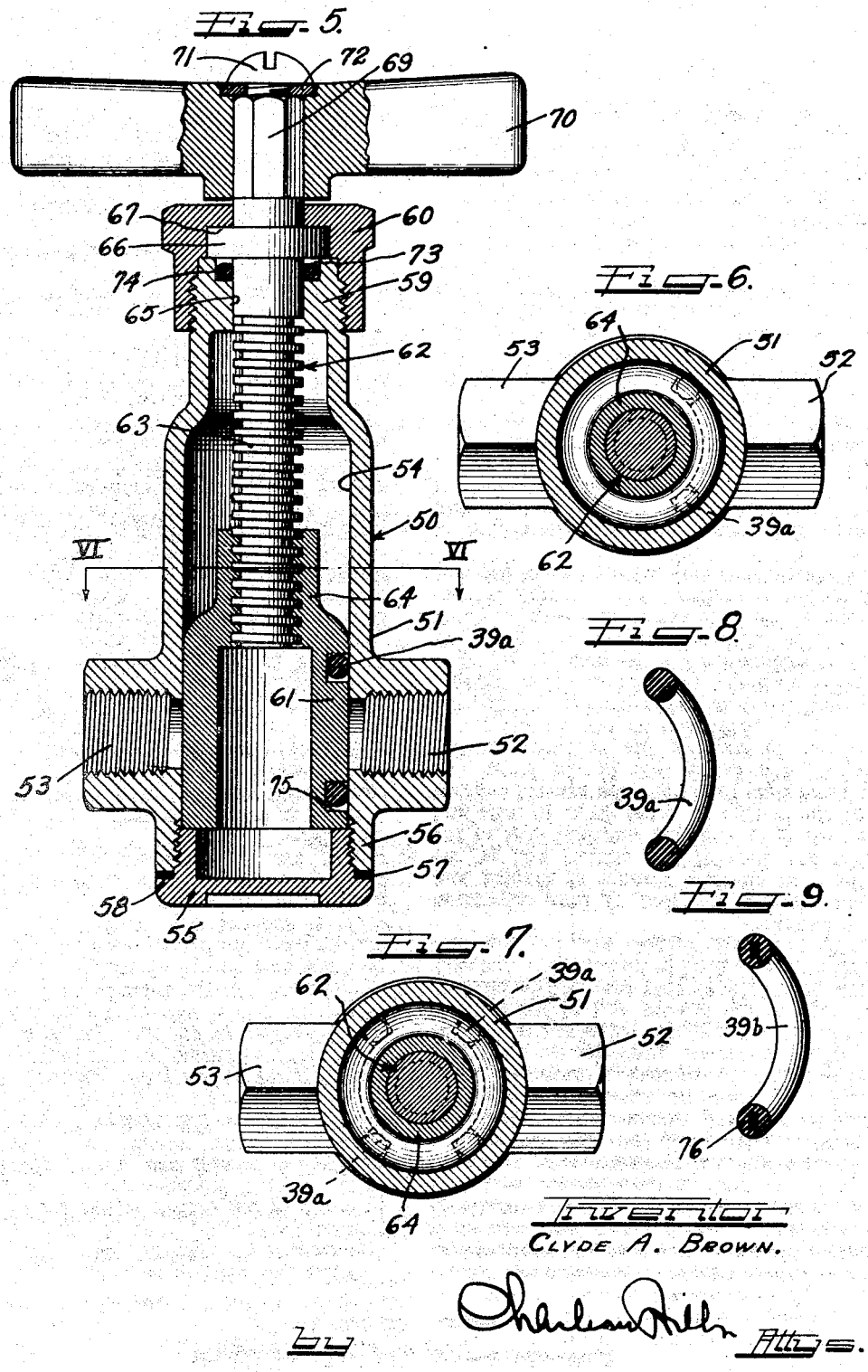

Patented Sept. 16, 1947

2,427,439

UNITED STATES PATENT OFFICE 2,427,439

VALVE

Clyde A. Brown, Chicago, Ill., assignor to The Dole Valve Company, Chicago, Ill., a corporation of Illinois Application August 27, 1943, Serial No. 500,209

2 Claims. (Cl. 251—62)

1

The present invention relates to a valve. More particularly, the invention concerns a gate type valve structure which embodies a sealing means preformed of moldable non-metallic plastic material which cooperates with at least one of the ports in the valve chamber to prevent leakage between the valve body and the chamber when the valve is closed.

It is an object of the present invention to provide a valve structure which is simple and economical to manufacture and yet insures a completely leak-proof structure.

It is a further object of the present invention to provide a valve structure embodying a preformed sealing means which surrounds at least one of the ports of said valve and cooperates with the body portion thereof and the chamber in which it is disposed to prevent leakage therebetween.

It is a further object of the present invention to provide a gate for a gate type valve with which a sealing means is associated in complementary relation.

In accordance with the general provisions of the present invention there is provided a valve which comprises a chamber having a plurality of fluid ports, a body reciprocably mounted in said chamber for opening and closing said ports and means cooperating with said body and said chamber for sealing at least one of the ports to prevent leakage between the body and the chamber when the body is in closed position in said chamber.

In accordance with further general features of the invention there is provided a gate for a valve comprising a body portion which has a groove provided in the periphery thereof and a sealing means preformed of suitable moldable non-metallic plastic material disposed in said groove to complement the external periphery of said body portion.

Still other objects and advantages will become apparent from the following description of several embodiments of the present invention illustrated in the accompanying drawings in which Figure 1 is a vertical section through the body of a typical gate type valve structure with which the principles of the present invention are adapted to be employed;

Figure 2 is a partial vertical section illustrating the gate of the valve of Figure 1 in elevation and embodying one form of sealing means to which the present invention relates;

Figure 3 is a horizontal section as seen from the line III—III of Figure 1;

2

Figure 4 is a horizontal section corresponding to that of Figure 3 but contemplating the use of only a single sealing means;

Figure 5 is a vertical section of another form of gate type valve to which the teaching of the present invention may be applied;

Figure 6 is a horizontal section as seen from the line VI—VI of Figure 5;

Figure 7 is a horizontal section corresponding generally to that of Figure 6 but employing a plurality of sealing means therein;

Figure 8 illustrates a segment of one form of sealing means of the present invention; and Figure 9 represents a segment of an alternate form of sealing means embodying the principles of the present invention.

A typical form of gate valve 10 which is illustrated in Figure 1 of the drawings includes a casting 11 provided with a plurality of ports, in this case, an inlet 12 and an outlet 13 which communicate with the chamber 14 thereof. A gate 15 which may be of square or rectangular cross-section is reciprocably mounted in the chamber 14 of the casting 11. An upper segment 16 is adapted to close the upper end of the casting 11 and is provided with a downwardly projecting flanged portion 17 which cooperates with a corresponding flanged portion 18 upon the casting 11 to form a suitable junction therebetween. The casting 11 and segment 16 may be held together in any suitable fashion such, for example, as by means of a plurality of countersunk bolts 19 which are adapted to be threaded into the casting 11. A suitable gasket 20 is disposed between the lowermost edge of the flanged portion 17 of the segment 16 and a shoulder 21 extending about the flanged portion 18 of the casting 11 to form a tight joint.

The segment 16 is provided with a threaded male portion 23 which is adapted to engage a cap 24 having an internal thread. A stud 25 provided with a male screw 26 at the lowermost end thereof which is adapted to be threaded into a female screw in the upper shank portion 27 of the gate 15 projects through a bore 28 in the uppermost end of the segment 16 and the cap 24. A suitable packing ring 29 is disposed in a counterbore 30 at the upper end of the bore 28 in the male portion 23 of the segment 16 so as to encircle the stud 25. A recess 31 is also provided in the under side of the cap 24 for the annular flange 32 formed upon the stud 25 which serves to position said stud 25 against the uppermost end of the male portion 23 of the segment 16 and to prevent axial displacement of said stud.

The stud 25, adjacent the end thereof which projects beyond the cap 24, is provided with an octagonally shaped portion 34 adapted to engage a correspondingly shaped opening in the handle 35 which is mounted upon the end of stud 25 as by means of the bolt 36 and the countersunk washer 37. The manipulation of the handle 35 causes the male screw 26 to advance through a female screw formed in the shank portion 27 of the gate 15 and thereby raises and lowers the gate 15 within the chamber 14 of casting 11, as may be desired. The gate 15, therefore, is reciprocably mounted so as to be raised and lowered with respect to the inlet 12 and outlet 13 thereby opening and closing the valve 10.

In order to seal the valve 10 effectively against the possibility of leakage of the fluid for the control of which the valve is intended, a suitable sealing means may advantageously be provided to cooperate with the gate 15 and the chamber 14 of the casting 11 to seal the inlet 12 when the valve is closed. A similar sealing means may be provided for the outlet 13 although this may be unnecessary when the inlet 12 is properly sealed.

The sealing means of the present invention comprises a preformed member of suitable moldable non-metallic plastic material which for the purpose of illustration has been shown as taking the form of an annulus or sealing ring 39. An annularly shaped groove 40 of a diameter corresponding to that of the sealing ring 39 is cut into the face 41 of the gate 15, in such fashion that when the gate is in its lowermost closed position the sealing ring 39 will completely enclose the inlet 12. A similar sealing ring 39 disposed in an annular grove 40 cut in the face 42 of the gate 15 may also be provided adjacent the outlet 13.

The sealing rings 39 are retained in the grooves 40 by virtue of the sealing principle achieved by the exertion of a pressure differential upon the rings. This principle is unique in that, as the pressure increases across the sealing ring 39, its sealing effect is materially increased. The sealing effect of the ring 39 is, therefore, proportioned to the pressure differential across the ring per se.

The sealing rings 39 may be formed of any suitable moldable non-metallic plastic material such, for example, as rubber, neoprene, or other like material as illustrated in Figure 8 of the drawings. It will be understood that the sealing ring 39 employed in valve 10 need not be preformed but may take the form of an annulus. The type of material employed in the fabrication of the sealing ring 39 will of course depend to a considerable extent upon the nature of the fluid for the control of which the valve 10 is intended to be employed. It may be desirable under certain circumstances to employ a sealing ring 39 having an internal reinforcement 76 of the character illustrated in Figure 9 of the drawings. This internal reinforcement may take the form of another plastic material which is dissimilar to that of the exterior of the ring or it may be made of metal or other similar material.

The movement of the gate 15 by the manipulation of the handle 35 will cause the sealing rings 39 to be continually worked by virtue of their contact with the surface of the chamber 14 of the casting 11. This continual working operation serves to enhance the life of the plastic material of which each of the rings 39 is fabricated. The sealing means contemplated by the present invention will serve for a long period of time to provide an effective seal against leakage between the valve body and the internal wall of the chamber when the valve is in closed position.

The valve 50 illustrated in Figure 5 of the drawings is, in general, substantially similar to that shown in Figure 1. The valve 50 differs from valve 10 in that the gate thereof is generally cylindrical in shape and thus permits the use of a one-piece casing or casting for the chamber. The valve 50 includes a casting 51 which is provided with a plurality of ports, in this case, inlet 52 and outlet 53 which communicate with the chamber 54 and are internally threaded for connection to a pipe line or other suitable form of conduit in which a gate valve is normally employed.

The casting 51 is provided at its base with a plug 55 which is threaded into or otherwise suitably secured to a downwardly projecting flanged portion 56 thereof. A suitable gasket 57 may be provided between the shoulder 58 of the plug 55 and the lowermost end of the flanged portion 56 to prevent leakage at the screw threads. The uppermost end of the casting 51 is provided with a threaded male portion 59 which is adapted to engage an internally threaded cap 60.

A gate 61 of generally cylindrical form is disposed within the chamber 54 of the casting 51. A stud 62 having adjacent the lowermost end thereof a male screw 63 is threaded into the corresponding female screw thread in the shank portion 64 of the gate 61. The other end of the stud 62 projects through the internal bore 65 of the male portion 59 and casting 51 and the cap 60 being retained in proper endwise relation by means of the annular flange 66 which registers with a recess 67 in the under side of the cap 60 and serves to hold said flange 66 of the stud 62 against the upper most end of the male portion 59. The end of the stud 62 which projects from the cap 60 is provided with an octagonally shaped portion 69 which cooperates with a similarly formed hole in the handle 70 which fits thereon and is held in place by means of the bolt 71 and the countersunk washer 72 contacting the upper face of the handle 70.

A counterbore 73 is provided in the upper end of the male portion 59 of the casting 51 and accommodates a packing ring 74 therein to aid in sealing the bore 65 into the male portion 59 of casting 51 against the possibility of leakage of the fluid therethrough from the chamber 54.

As in the case of the previously described embodiment of the invention illustrated in Figure 1 of the drawings, a suitable sealing ring 39a may be provided in the outer periphery of the gate 61 adjacent to one or more of the ports 52, 53 in the casting 51. In the embodiment of the invention illustrated in Figure 5, however, it is contemplated to employ a sealing ring 39a only at the inlet port 52. An annularly shaped groove 75 is cut into the outer wall of the gate 61 to receive the sealing ring 39a.

It will be understood from Figures 6 and 7 that the sealing ring 39a will be required to be preformed to a substantially concave-convex configuration so as to conform generally to the periphery of the gate 61. The sealing ring 39a is retained in the groove 75 in the manner explained above with respect to sealing ring 39 in the embodiment of the invention illustrated in Figures 1 to 4, inclusive.

As in the case of the previously described embodiment of the invention, the sealing ring 39a may take the form of the solid ring illustrated in Figure 8 or it may be provided with an internal reinforcement 76 of the character illustrated in Figure 9 and indicated by reference character 39b. As many sealing rings 39 and 39a may be employed as there are ports associated with the valve structure. It will ordinarily be unnecessary, however, to provide any more of such sealing rings than will be required to satisfactorily seal the inlet port.

As before, the manipulation of the handle 70 of the valve of Figure 5 will cause the male screw portion 63 of the stud 62 to thread through the shank portion 64 of the gate 61 thereby causing the gate 61 to reciprocate. In the raising and lowering of the gate 61 with respect to the inlet 52 and outlet 53 in the chamber 54, the sealing ring 39a will be caused to be continually worked and as a result of this operation its life will be considerably enhanced.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A valve comprising a chamber member having a fluid port extending therefrom, a body member movably mounted in said chamber member for opening and closing said port, at least one of said members having, in a face surface thereof, an annular groove of larger internal diameter than said fluid port, said groove substantially encircling the mouth of said port when the body member is in port closed position, and means to prevent fluid leakage between said chamber member and said body member when the latter is in port closed position, said means including a resilient ring positioned in said annular groove, said ring being contacted by the other of said members opposite the bottom of said groove, and the spacing between said other member and said groove bottom being slightly less than the normal thickness of the ring positioned therebetween whereby said ring is pressed against the bottom of said groove, the width of said groove however being greater than the corresponding width of the ring therein whereby said ring can move bodily within said groove upon movement of the body member, thereby working the material of said ring and preserving its resiliency.

2. In a valve assembly including a chamber member having a fluid port, a member for controlling the flow of fluid through said port movably mounted in said chamber member and having a surface opposing the ported area within said chamber member, said surface being movable across said port, said surface having an annular groove therein of larger internal diameter than said port and adapted in one position of the controlling member to encircle said port, and an elastic material sealing ring positioned in said groove, said ring being contacted by the surface of the area surrounding said port, and the spacing between said surface and the bottom of said annular groove being slightly less than the normal thickness of that portion of the elastic ring positioned therebetween whereby said ring is pressed against the bottom of the groove by said surface, the width of said groove however being greater than the corresponding width of said elastic ring, whereby, in the movement of the controlling member across said port, the ring will roll in said groove with the diametrically opposite sides of the ring, taken on a diameter therethrough following the direction of movement of the controlling member, rolling in the same direction transversely to the principal axis of the ring thereby effecting working of the ring material.

CLYDE A. BROWN.

REFERENCES CITED

The following references are of record in the file of this patent:

UNITED STATES PATENTS

| Number | Name | Date |
| --- | --- | --- |
| 2,360,733 | Smith | Oct. 17, 1944 |
| 2,242,467 | Hamer | May 20, 1941 |
| 2,314,683 | Berry | Mar. 23, 1943 |
| 2,134,277 | Sproull | Oct. 25, 1938 |
| 207,871 | Horton | Sept. 10, 1878 |
| 1,048,364 | Smith | Dec. 24, 1912 |
| 1,824,157 | King | Sept. 22, 1931 |
| 850,230 | Kiehle | Apr. 16, 1907 |
| 394,475 | Dwyer | Dec. 11, 1888 |